April 10, 1934.  A. B. FULLER  1,954,313
ELECTRONIC CHRONOMETER
Filed April 27, 1932   2 Sheets-Sheet 1

Inventor:
Albert B. Fuller,
By Newton M. Perrins
Rolla N. Carter
Attorneys

April 10, 1934.                A. B. FULLER                1,954,313
                            ELECTRONIC CHRONOMETER
                            Filed April 27, 1932           2 Sheets-Sheet 2
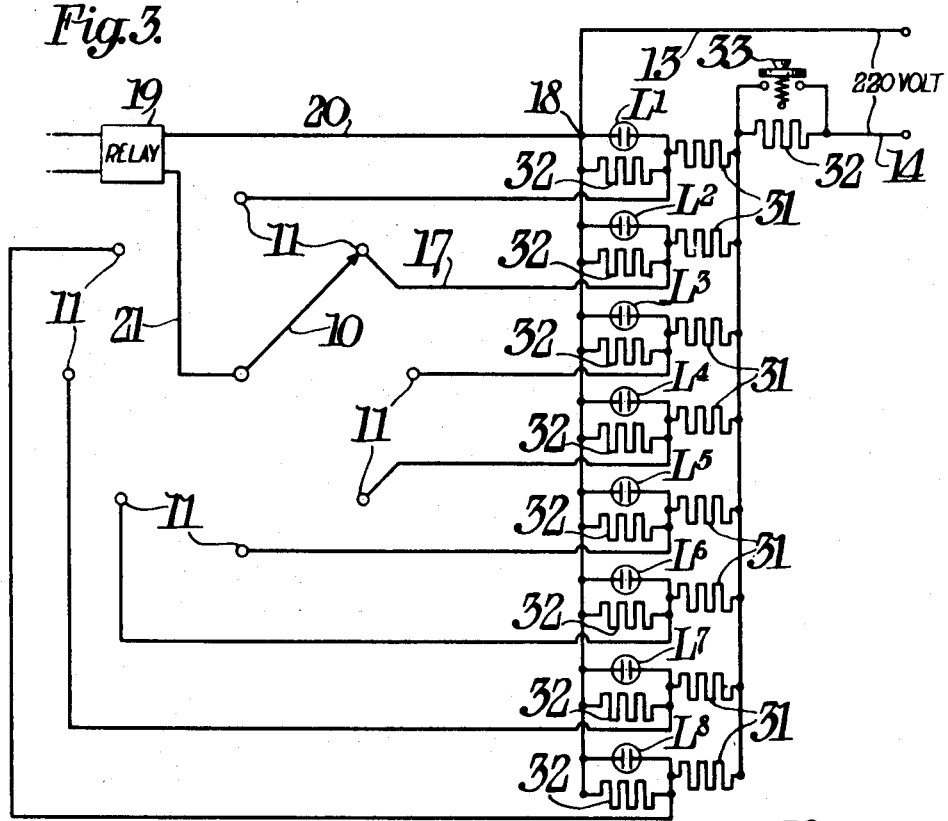
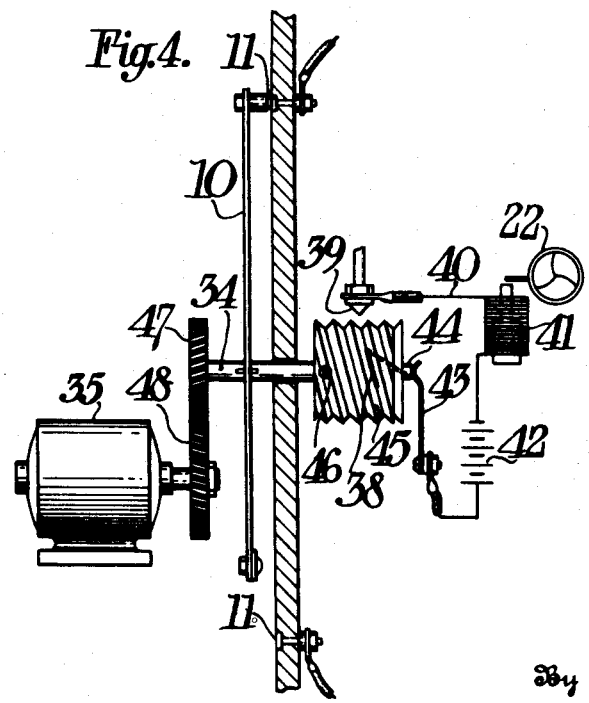
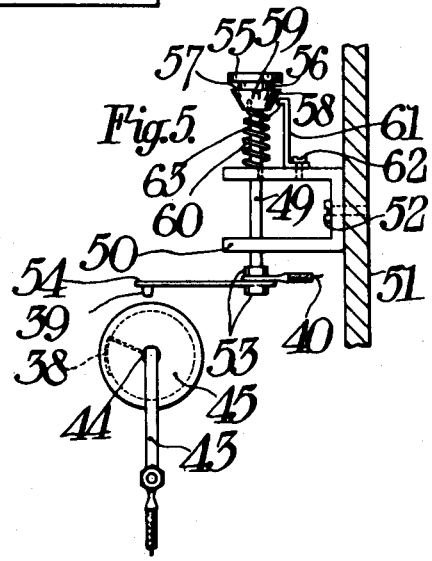
Inventor:
Albert B. Fuller, Patented Apr. 10, 1934

1,954,313

UNITED STATES PATENT OFFICE 1,954,313

ELECTRONIC CHRONOMETER

Albert B. Fuller, Rochester, N. Y., assignor to Eastman Kodak Company, Rochester, N. Y., a corporation of New York Application April 27, 1932, Serial No. 607,747

10 Claims. (Cl. 175—183)

This invention relates to a method and apparatus for measuring short intervals of time and more particularly to the measuring of minute time intervals occurring between the starting and stopping of an event or operation.

There have been constructed hitherto numerous devices of varying degrees of accuracy for determining extremely short intervals of time. That is, of the order of 1/100th of a second; but it has usually been necessary to make some kind of a record to be inspected later on a sensitized surface which must be submitted to photographic baths before the result is known. In factories where a large number of determinations are made daily as in the testing of photographic shutters it is highly desirable that the result of each determination be immediately available as well as accurate.

The main object of my invention is to provide a method and apparatus for testing the speed of a photographic shutter in which the individual shutter may be placed and a direct measurement made; that is, a measurement that may be read immediately. Other objects are to make such a tester which will be accurate within the degree necessary in factory tests; which is simple in structure and operation so that any intelligent workman may use it; and upon which the indication may be destroyed or erased at any time. Further objects are to provide means to adjust the apparatus as required to permit higher shutter speeds that is, shorter time intervals, to be measured with the same degree of accuracy as lower speeds; and to operate the shutter automatically at such a period in the functioning of the apparatus that the zero point for the different indications will be the same.

For further illustration of my invention and one of its applications, reference is to be had to the accompanying drawings in which:

Figure 3 shows a wiring diagram of the full quota of indicating elements of Figure 2;

Figure 4 is a more or less diagrammatic view showing the motor drive and shutter operating arrangement; and, Figure 5 is a detail showing of the push button control shown in Figure 4.

It is well known that the ignition or striking voltage of an ordinary glow discharge device such as a neon lamp is considerably higher than its extinction voltage. This property may be employed to indicate or record the time elapsing during the occurrence of an event. If a plurality of such lamps are supplied with a voltage above their extinction voltage but below their striking voltage they will remain dark. Now if a striking voltage is temporarily impressed on the lamps they will ignite and continue to glow after the striking voltage has been removed, for although the voltage formerly impressed on them was not sufficient to ignite them it is sufficient to prevent their extinction and they will continue to glow until such time as the voltage impressed upon them is removed or lowered to the extinction value.

With the above in mind it will be obvious that if during the occurrence of an event the striking voltage is applied progressively to the lamps, one after another, in a determinable time sequence the total number of lamps ignited is a definite function of the time elapsing during the occurrence of the event.

Figure 1:
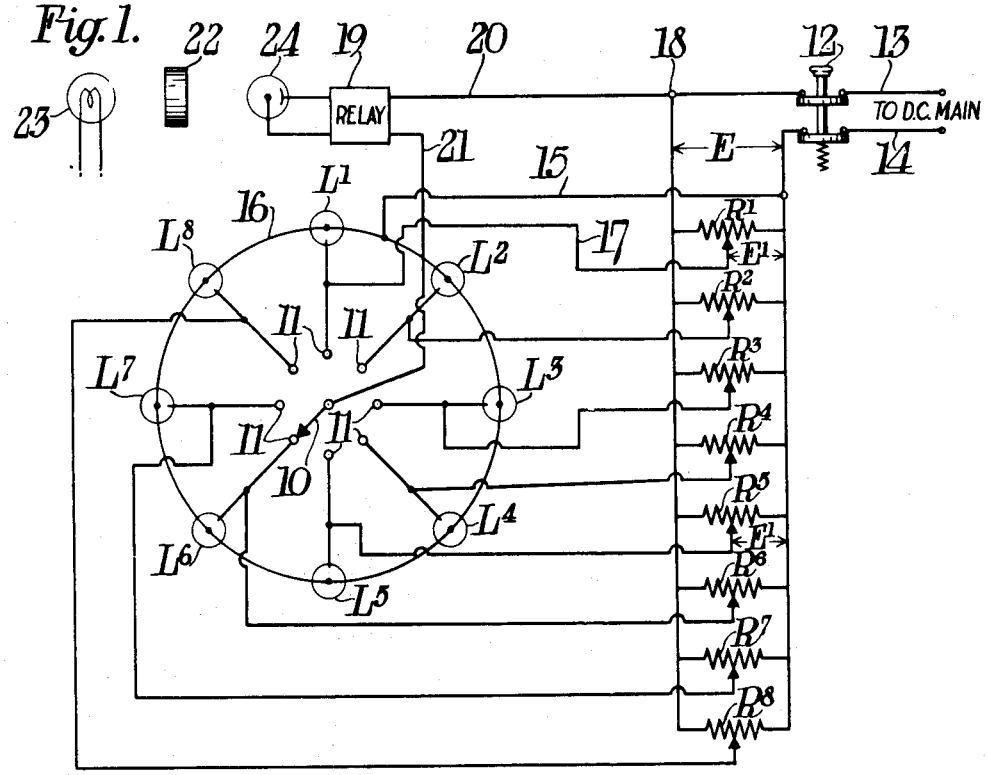
Figure 1 is a schematic illustration of a tester arranged in accordance with one embodiment of my invention and shows the general principle of its operation.

Referring to the drawings I have indicated in Figure 1 a timing apparatus including a rotatable contact arm 10, adapted to pass over a series of contacts 11, after the manner of a distributor. It is apparent that the time required for the arm 10 to pass over any given number of the equally spaced contacts 11 may be made as small as desired (within practical limits of construction) and with the arm 10 rotating at constant speed this time interval is constant.

A series of glow lamps $L_1$—$L_2$-$L_8$ are individually connected to the contacts 11 and to individual voltage dividers $R_1$—$R_2$-$R_8$ which are connected in multiple through a normally closed push switch 12, leads 13 and 14 to any suitable source of direct current. The voltage dividers $R_1$-$R_8$ are so adjusted that the voltage $E_1$ applied to each of the glow lamps $L_1$-$L_8$ is slightly below the ignition voltage of the lamp. This voltage is applied to each of the lamps $L_1$-$L_8$ through similar circuits and the circuit of the lamp $L_1$ alone will be traced. This circuit can be traced from one side of the voltage divider $R_1$ through a lead 15, a bus ring 16, the lamp $L_1$ and a lead 17 to the adjustable contact of the voltage divider $R_1$.

Assuming that the contact arm 10 is rotating and that the circuit from the arm 10 to a point of connection 18 common to all of the voltage dividers R₁–R₈ is closed for a time by a relay 19. When the arm 10 passes over a contact 11 it in effect short-circuits the portion of the corresponding voltage divider appearing between its adjustable contact and the common point of connection 18. When the arm 10 is over the contact 11 connected to the lamp L₁ the short circuit may be traced from the common point 18 through line 20 to relay 19, a line 21, the arm 10 and contact 11, and the lead 17 to the adjustable contact of the divider R₁. The above short circuit impresses full line voltage on the corresponding glow lamp causing it to ignite and after the contact arm 10 has moved on to remove the short-circuit the voltage represented by E₁ maintains the lamp in glowing condition for as long as the observer desires.

If the speed of rotation of the arm 10 is constant and known it becomes apparent from the above that the number of lamps ignited bears a definite and readily calculable relation to the time interval during which the relay 19 remained closed.

A normally closed push switch 12 is provided for removing all voltage from the lamps L₁–L₈ to darken them in preparation for the next measuring operation.

The apparatus so far described may be used to measure the time elapsing during a period the relay 19 is closed somewhat as follows:

Suppose the relay 19 closes just as the arm 10 is passing over the contact 11 of the lamp L₁ and opens when the arm 10 is between the contacts of the lamps L₆ and L₇. The lamps L₁ to L₆ will be ignited and remain glowing but the lamps L₇ and L₈ will remain dark. The time T indicated and recorded by the action as described is:

$$T = \frac{n_1}{n_2} t$$

Where $n_1$ = number of lamps ignited.
$n_2$ = total number of lamps, and
$t$ = period of the arm 10.

Assuming the speed of rotation of the arm 10 to be 600 R. P. M. then its period $t$ becomes .1 seconds. Substituting in the above formula and solving we have T = .075 seconds as the length of time the relay 19 remained closed.

An error may be introduced by the relay 19 closing just after the arm 10 passed the contact of the lamp L₈ and opening just before the arm 10 reached the contact of the lamp L₇. The maximum error which may be introduced by this cause is:

$$\% \text{ error} = \left(100 - \frac{n}{n_1 + X}\right)$$

Where $n_1$ has the same meaning as before and $0 < X < 2$.

The error can be kept small by making $n_1$ large which requires that $n_2$ be large also. In practice at present I am using fifty lamps and rotate the arm 10 at a speed which will ignite approximately forty lamps. The maximum error introduced is less than five percent which is well within the tolerance permissible in most factory tests.

While the apparatus as above described may be used to measure the time occupied by the occurrence of any event which may be caused to operate a relay, I have shown and will now describe my invention as applied to the testing of the speed of photographic shutters.

In the embodiment illustrated in Figure 1 I have placed a shutter 22 to be tested between a source of light 23 and a light sensitive cell 24. The cell 24 is connected to the relay 19 which preferably may be a grid glow tube or a thyratron.

When the release of the shutter 22 is pressed the shutter starts to open and permits light to strike the cell 24, the response of which operates relay 19 to impress full line voltage across the lamps and the rotating arm 10. As the arm 10 rotates the lamps are ignited in succession until the shutter 22 closes to cut off the light from the sensitive cell 24 at which time the relay 19 opens. It is to be noted that the only time lag involved in the system is the time required for the relay to operate and the glow lamps to ignite. Since both of these actions are of an electronic nature, the time lag is only a few micro-seconds and, generally, may be totally disregarded.

As above pointed out, the glow lamps ignited during the measuring operation continue to glow until the operator extinguishes them by momentarily pressing the switch 12. This arrangement provides unlimited time for the reading of the results and by pressing a switch the indication is instantly obliterated and the apparatus is again set for the making of another test.

While unnecessary in practising my invention it is of considerable practical value to have the time interval being measured commence at the same point in the cycle of operation of the apparatus so that the indication will always begin with a certain lamp and the operator in interpreting the indication need only determine which lamp was the last to be ignited. Since only the first and last lamps ignited during the test are necessary to give a complete indication it is at once obvious that a considerable number of the intermediate lamps may be omitted if desired.

One suitable arrangement for causing the indication to start with a predetermined lamp will be described in connection with the description of a modified embodiment of my invention illustrated in Figure 2. In this figure light from the source 23 passed by the shutter 22 falls on the sensitive cell 24 which controls the operation of the relay 19 as in Figure 1. In the arrangement now to be described the lamps L₁–L₈ are normally glowing and the indication of the measurement is made by successively extinguishing the lamps during the time the relay 19 is closed. A circuit arrangement suitable for accomplishing this will be described in connection with a single lamp L₂.

A voltage divider shown as consisting of three resistors 30, 31, and 32 is connected across the leads 13 and 14 connected to a suitable source supplying a potential somewhat above the striking potential of the glow lamps used.

The three resistors 30, 31 and 32 are selected so that when all three are across the leads 13 and 14 the voltage drop across the resistor 30 is above the extinguishing voltage but below the striking voltage of the glow lamp L₂ shunting it. The resistors 31 and 32 are selected having resistance values such that when the resistor 32 is shorted as by closing a normally open push switch 33 the voltage drop across the resistor 30 is greater than the striking voltage of the glow lamp L₂.

The contact arm 10 mounted on a shaft 34 is adapted to be rotated at a constant speed by a synchronous motor 35 connected through a switch 36 to a suitable power line 37.

The shaft 34 is preferably of some insulating material and is provided with a second contact arm 38 which rotates therewith and is adapted (as will be described in detail in connection with Figures 4 and 5) at the will of the operator to close a circuit through a contact 39, lead 40, a solenoid 41, a source of potential 42 and a brush 43 in sliding engagement with a conducting portion 44 of the shaft 34 to which the contact arm 38 is connected.

Figure 2:
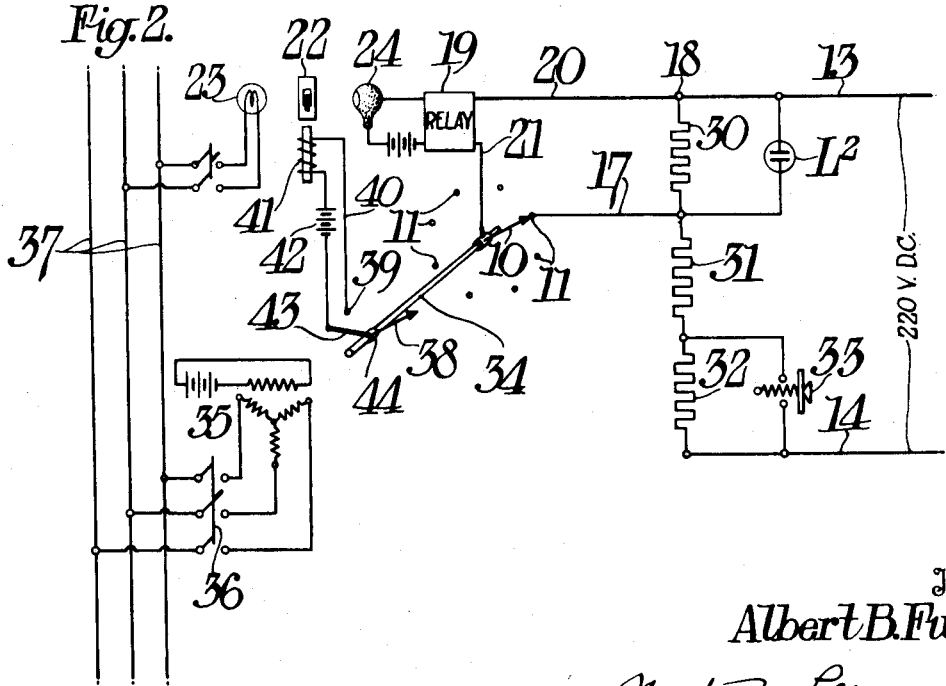
Figure 2 shows a circuit organization whereby my invention may be carried into effect. The invention in the instance shown being applied to means for measuring the speed of a photographic shutter.

Figure 3 is a diagram showing one circuit organization suitable for the entire series of glow lamps and amounts to a repetition of the single lamp circuit shown in Figure 2. It is to be noted that the resistor 32 need not be duplicated and that when it is shunted by pressing the switch 33 to circuit closing position a higher voltage is impressed on all of the lamps $L_1$–$L_8$.

In Figures 4 and 5 I have illustrated a control device for causing the indication, whether light or dark, to start always with the same glow lamp as comprising a threaded drum 45 secured by a set screw 46 to the shaft 34 which is adapted to be driven by the motor 35 through helical gears 47 and 48.

The threaded drum 45 is provided in one of its grooves with a short piece of conducting material 38 such as a short length of wire which is connected through the drum 45 to a trunnion 44 of some conductive material. The wire 38 and its lead comprises the contact arm 38 of Figure 2. The contact point 39 is adapted to be depressed into engagement with the threaded drum 45 and when the drum 45 is rotating in the direction indicated by the arrow in Figure 5 the contact point 39 will follow the groove and in so doing will slide over to wire 38 to temporarily close the circuit energizing the solenoid 41 as described above.

A push button device suitable for depressing the contact point 39 into engagement with the drum 45 is illustrated in Figure 5 as comprising a shaft 49 slidably and rotatably mounted in the arms of a U-shaped member 50, secured to any suitable base 51, by a screw 52. The lower end of the shaft 49 is threaded to receive a nut 53 for holding in position and contacting relation the end of the lead 40 and a resilient member 54 which carries at its free end the contact point 39. At its upper end the shaft 49 is provided with a cylindrical head 55 provided with a peripheral slot 56 to form a shoulder 57. The part of the head 55 below the shoulder 57 is made in the form of an inverted frustum of a cone having a surface 58 and is provided with an axial slot 59 of the same depth as the peripheral slot 56. The shaft 49 is biased to the position shown in Figure 5 by a coiled spring 60 which is anchored in the upper arm of the U-shaped member 50 and the lower end of the head 55. A vertically extending spring latch 61 secured to the upper arm of the member 50 by a screw 62 is provided with a horizontal portion 63 adapted to bear against the conical surface 58 and to engage the shoulder 57 to retain the head 55 in depressed position after it has been depressed manually.

In the operation of the last described device with the motor 35 driving the contact arm 10 and the threaded drum 45 at a constant speed, when the head 55 is manually depressed the spring latch 61 will force the portion 63 into the slot 56 to hold the head 55 in depressed position against the compression of the coiled spring 60 and the lower end of the shaft 49 through the resilient member 54 will force the contact point 39 into engagement with the threaded drum 45. Since the drum 45 is rotating, the point 39 in following the groove will move toward the contact wire 38 and at the same time will rotate the shaft 49 and its head 55 against the torsion of the coiled spring 60. When the point 39 engages the wire contact 38 the circuit of the solenoid 41 will be closed to operate the shutter 22 to start the measuring operation. Since both the drum 45 and the contact arm 10 are rigidly mounted on the shaft 34 it is obvious that the shutter 22 will always be opened with the contact arm 10 in a definite angular position so that successive records will be started at the same point.

After the point 39 has passed over the contact wire 38 to actuate the shutter 22 the head 55 will have been rotated to bring the axial slot 59 under the portion 63 and the compressed spring 60 will push the head 55 upward and remove the point 39 from the groove of the drum 45. The torsion of the spring 60 then returns the whole device to its initial position as shown in Figure 5.

Although I have illustrated my invention as applied to testing the speed of photographic shutters it is obviously not restricted to use in that art alone. While I have shown the shaft 34 as being driven by a synchronous motor through gears, obviously the gears may be dispensed with or other sources of power may be employed. Various modifications of my invention will readily suggest themselves to persons skilled in the art without departing from the scope of my invention as set forth in the appended claims.

What I claim as new and desire to secure by Letters Patent of the United States is:—

1. An electronic chronometer comprising in combination a plurality of glow discharge devices, a source of power, a plurality of voltage dividers connected in parallel to the source of power, said glow discharge devices being so connected to said dividers that the voltage across them is intermediate between their ignition and extinction voltages, a uniformly moving contact adapted to connect a relatively low resistance successively in shunt relation with said glow discharge devices, means for temporarily impressing an ignition voltage across each of said discharge devices to cause them to glow, and an electronic relay in circuit with said moving contact, whereby the number of glow discharge devices ignited is proportional to the length of time the electronic relay remains in circuit closing condition, and means responsive to the occurrence of an event for controlling said relay.

2. In combination a plurality of glow discharge devices, said devices being so connected that a voltage above their extinguishing voltage but below their striking voltage is impressed on each device, a source of potential higher than the striking voltage of said devices, a movable contact for successively connecting said devices to said source of potential, a circuit making and breaking element interposed between said movable contact and said source of potential, and means for controlling the actuation of the circuit making and breaking element.

3. In a shutter testing machine the combination with a plurality of glow discharge lamps, and a shutter holder, means for progressively striking said lamps in time sequence and means for rendering the striking means operative only when the shutter is open.

4. In apparatus for measuring the speed of a photographic shutter, the combination with a source of light and a photographic shutter, of an electronic relay for effecting the closing of an electrical circuit, a light sensitive element electrically connected to said relay and positioned to receive light from said source when said shutter is open, a plurality of glow discharge devices and means controlled by the closing of said electrical circuit for successively igniting said glow discharge devices in time sequence.

5. In a photographic shutter tester the combination with a light sensitive element, of a lamp, means for holding the shutter in position to intercept light rays passing from the lamp to the sensitive element, a plurality of indicating elements, and means controlled by said light sensitive element for progressively actuating said indicating elements.

6. In apparatus for testing the speed of photographic shutters the combination with a lamp and a light sensitive element, of means for holding a shutter in light intercepting position between the lamp and the sensitive element, whereby when the shutter is actuated to open and close, the sensitive element will be activated, a uniformly rotating member having a period greater than the period of time the shutter will remain open, means for actuating the shutter, means controlled by the response of said sensitive element for measuring the angular travel of said rotating member during the interval the shutter is open, and means controlled by said rotating member for operating said shutter actuating means when said rotating member occupies a predetermined angular position.

7. An apparatus for measuring the speed of photographic shutters comprising shutter releasing means for opening and closing a shutter, an electrical circuit containing a relay, a plurality of indicating means, continuously rotating means for successively connecting said indicating means to said circuit, means for actuating said shutter releasing means, means for closing said relay when said shutter is open, and means governed by said rotating means for controlling the operation of said actuating means.

8. In apparatus of the class described, a circuit closing relay, means for holding the relay in circuit closing position for the duration of a measured event, a plurality of elements adapted upon energization to give visible indications, a source of energy, and a continuously rotating member adapted to connect said elements in timed succession to said source of energy through said relay, whereby the total number of elements caused to give indications is proportional to the time interval being measured.

9. In shutter testing apparatus, a holder for a shutter to be tested, shutter actuating means, means for progressively producing a series of visible indications in a known time sequence, means for rendering operative said indicating means only when the shutter is open, and means for operating said shutter actuating means in timed relation with said indicating means.

10. In time measuring apparatus, a light sensitive element, means for projecting light upon said element for the duration of the time interval being measured, means for producing a series of visible indications separated from each other by a known period of time, and a relay for rendering operative said indication producing means only when light is falling upon said sensitive element.

ALBERT B. FULLER.